(12) United States Patent
Heinzen et al.

(10) Patent No.: US 8,591,242 B2
(45) Date of Patent: Nov. 26, 2013

(54) FLOATING BATTERY CONTACT MODULE FOR A POWER TOOL

(75) Inventors: William J. Heinzen, Glenview, IL (US); Robert Scott Buetow, Lake in the Hills, IL (US)

(73) Assignee: Illinois Tool Works Inc., Glenview, IL (US)

( * ) Notice: Subject to any disclaimer, the term of this patent is extended or adjusted under 35 U.S.C. 154(b) by 159 days.

(21) Appl. No.: 12/756,734

(22) Filed: Apr. 8, 2010

(65) Prior Publication Data
US 2011/0247849 A1 Oct. 13, 2011

(51) Int. Cl.
*H01R 13/64* (2006.01)
(52) U.S. Cl.
USPC .......................... 439/248; 439/500
(58) Field of Classification Search
USPC ............. 439/247, 248, 500; 310/50; 320/112, 320/113; 429/96–100, 121
See application file for complete search history.

(56) References Cited

U.S. PATENT DOCUMENTS

| | | | |
|---|---|---|---|
| 2,592,207 A | 4/1952 | Stamper | |
| 3,079,510 A * | 2/1963 | Hartwig | 307/65 |
| 3,210,847 A * | 10/1965 | Prufer | 433/131 |
| 3,823,367 A * | 7/1974 | Kaye et al. | 324/426 |
| 3,956,021 A * | 5/1976 | Tsygankov et al. | 429/97 |
| 3,999,110 A * | 12/1976 | Ramstrom et al. | 320/112 |
| 4,129,688 A * | 12/1978 | Fischer et al. | 429/97 |
| 4,403,722 A | 9/1983 | Nikolich | |
| 4,481,458 A * | 11/1984 | Lane | 320/112 |
| 4,483,473 A | 11/1984 | Wagdy | |
| 4,483,474 A | 11/1984 | Nikolich | |
| 4,552,162 A | 11/1985 | Finger | |
| 4,586,777 A * | 5/1986 | Wied | 439/358 |
| 4,810,204 A * | 3/1989 | Wilson | 439/343 |
| 4,835,410 A * | 5/1989 | Bhagwat et al. | 307/64 |
| 5,220,520 A * | 6/1993 | Kessoku | 361/679.31 |
| 5,251,329 A * | 10/1993 | Takagi et al. | 455/572 |
| 5,259,786 A * | 11/1993 | Huang | 439/500 |
| 5,280,273 A * | 1/1994 | Goldstein | 340/632 |
| 5,317,247 A * | 5/1994 | Chong et al. | 320/112 |
| 5,350,317 A * | 9/1994 | Weaver et al. | 439/500 |
| 5,354,215 A * | 10/1994 | Viracola | 439/500 |
| 5,368,954 A * | 11/1994 | Bruns | 429/97 |
| 5,439,761 A * | 8/1995 | Hunag | 429/100 |
| 5,441,828 A * | 8/1995 | Akazawa | 429/121 |
| 5,473,242 A * | 12/1995 | McKenna | 320/113 |
| 5,615,250 A * | 3/1997 | Kobayashi | 455/558 |
| 5,697,070 A * | 12/1997 | Liebler | 455/575.1 |
| 5,716,730 A * | 2/1998 | Deguchi | 429/97 |
| 5,769,657 A * | 6/1998 | Kondo et al. | 439/500 |
| 5,830,007 A * | 11/1998 | Fry et al. | 439/500 |
| 6,093,056 A * | 7/2000 | Donauer et al. | 439/500 |

(Continued)

*Primary Examiner* — Neil Abrams
(74) *Attorney, Agent, or Firm* — Greer, Burns & Crain, Ltd.; Patty Chidiac; Mark W. Croll

(57) ABSTRACT

A battery contact module for use in a power tool including a housing (12) and a battery (30) insertable into the housing. The battery contact module (28) includes a contact block (32) movably connected to the housing (12) and a pair of opposing terminals (34) attached to the contact block (32) and configured to contact the battery (30). Thus, the contact block (32) moves relative to the housing (12) to maintain constant electrical contact pressure between each of the terminals (34) and the battery (30). The contact block (32) including locating posts (52) that loosely engage receptacle (22) on the housing (12) to allow for movement or float of the contact module in the housing.

19 Claims, 6 Drawing Sheets

(56) References Cited

U.S. PATENT DOCUMENTS

| | | | |
|---|---|---|---|
| 6,139,359 A * | 10/2000 | Fuhreck et al. | 439/500 |
| 6,176,412 B1 | 1/2001 | Weinger et al. | |
| 6,319,053 B1 * | 11/2001 | Andrews et al. | 439/500 |
| 6,350,149 B1 * | 2/2002 | Nakane | 439/500 |
| 6,436,569 B1 * | 8/2002 | Dijkstra et al. | 429/97 |
| 6,551,123 B1 * | 4/2003 | Schaeffeler et al. | 439/374 |
| 6,554,640 B1 * | 4/2003 | Koike et al. | 439/500 |
| 6,597,572 B2 * | 7/2003 | Nishikawa et al. | 361/695 |
| 6,786,381 B2 * | 9/2004 | Shkolnikov | 227/130 |
| 6,939,155 B2 * | 9/2005 | Postrel | 439/297 |
| 6,945,666 B2 * | 9/2005 | Woolfson | 362/183 |
| 6,977,481 B2 * | 12/2005 | Smith | 320/113 |
| 7,064,520 B2 * | 6/2006 | Heigl et al. | 320/114 |
| 7,066,752 B2 * | 6/2006 | Hsu et al. | 439/248 |
| 7,402,062 B2 * | 7/2008 | Perry | 439/248 |
| 7,588,471 B2 * | 9/2009 | Rejman | 439/680 |
| 7,589,500 B2 | 9/2009 | Johnson et al. | |
| 7,629,766 B2 * | 12/2009 | Sadow | 320/111 |
| 7,659,694 B2 * | 2/2010 | Griffin | 320/114 |
| 7,741,809 B2 | 6/2010 | Zick et al. | |
| 7,887,942 B2 * | 2/2011 | Rejman et al. | 429/97 |
| 7,944,174 B2 * | 5/2011 | Casalena et al. | 320/112 |
| 7,999,507 B2 | 8/2011 | Heinzen | |
| 8,062,060 B2 * | 11/2011 | Rejman | 439/527 |
| 8,113,868 B2 * | 2/2012 | Glauning et al. | 439/435 |
| 8,389,143 B2 * | 3/2013 | Roßkamp et al. | 429/100 |
| 2008/0187822 A1 * | 8/2008 | Breitenbach | 429/100 |
| 2010/0221594 A1 * | 9/2010 | Ro kamp et al. | 429/100 |
| 2010/0224666 A1 * | 9/2010 | Miyata | 227/9 |
| 2010/0261045 A1 * | 10/2010 | Wu et al. | 429/98 |
| 2011/0247849 A1 * | 10/2011 | Heinzen et al. | 173/171 |

* cited by examiner

FLOATING BATTERY CONTACT MODULE FOR A POWER TOOL

BACKGROUND

The present invention relates generally to power tools employing batteries to power various tool functions, and more specifically to a battery for such a tool.

The present battery is intended for use with power tools generally; however a preferred type of tool is portable, such as a combustion-powered fastener driving tool, also commonly referred to as a combustion tool or combustion nailer. Tools of this kind are manufactured by Illinois Tool Works, Inc. of Glenview, Ill. and are described in commonly assigned patents U.S. Pat. Nos. 4,552,162; 4,483,473; 4,483,474; 4,403,722 and 6,176,412, all of which are incorporated by reference herein.

Generally, such combustion tools incorporate a housing enclosing a small internal combustion engine. The engine is powered by a canister of pressurized fuel gas, also called a fuel cell. A powerful, battery-powered electronic power distribution unit produces the spark for ignition, and a fan located in the combustion chamber provides both an efficient combustion within the chamber, and facilitates scavenging, including the exhaust of combustion by-products. The engine includes a reciprocating piston with an elongate, rigid driver blade disposed within a cylinder. Such tools include electronic control systems, spark generators, electric fan motors, and other electronic components, and are powered by batteries.

Conventional power tool batteries are preferably rechargeable and are configured for releasably locking into place when electronically connected to a corresponding power tool. This locking engagement facilitates operation of the tool when subject to environmental stress and significant operational shock impacts that potentially cause disconnection and/or power disruption. Thus, one design criteria of such batteries is the ability to maintain the electrical connection while withstanding environmental stress and operational shock impact forces to which such tools are exposed.

Power tool batteries, like most batteries, have a pair of electrical terminals that contact corresponding electrical terminals on a battery module fastened inside a battery chamber in the tool housing. The connection between the respective battery and tool terminals enables the stored electrical energy in the battery to be transferred to the tool. It is therefore important to maintain consistent, even contact pressure between the respective terminals by aligning the battery with the battery module as shown in FIG. 1. Manufacturing variations occur, however, often resulting in misalignment between the battery module and the battery as shown in FIG. 2. When the battery and the battery module are misaligned, one of the terminals does not have sufficient contact to maintain proper tool operation.

SUMMARY

The above-described drawbacks of prior art tools are addressed by a battery contact module that, upon assembly in the power tool housing, moves within the housing to allow contact terminals of the module to adjust to variations in the positioning and alignment of the battery. Thus, consistent electrical contact and constant terminal pressure are maintained between the electrical terminals of the battery and the battery contact module in the power tool, and alignment variations are accommodated.

More specifically, a battery contact module is provided for use in a power tool including a housing and a battery insertable into the housing. The battery contact module includes a contact block movably connected to the housing and a pair of opposing terminals attached to the contact block and configured to contact the battery. Thus, the contact block moves relative to the housing to maintain constant electrical contact pressure between each of the terminals and the battery.

In another embodiment, a power tool is provided that includes a housing defining a longitudinal axis and including a pair of opposing receptacles, and a battery that is insertable into the housing and includes two battery terminals. The power tool also includes a battery contact module having a contact block with a pair of locating posts where each of the posts is movably connected to a corresponding one of the receptacles. A pair of opposing module terminals are attached to the contact block and configured to contact the battery terminals, where clearance between the receptacles and the locating posts enables the battery contact module to move within the housing to maintain constant contact pressure between the module terminals and the battery terminals.

DETAILED DESCRIPTION

Figure 4:
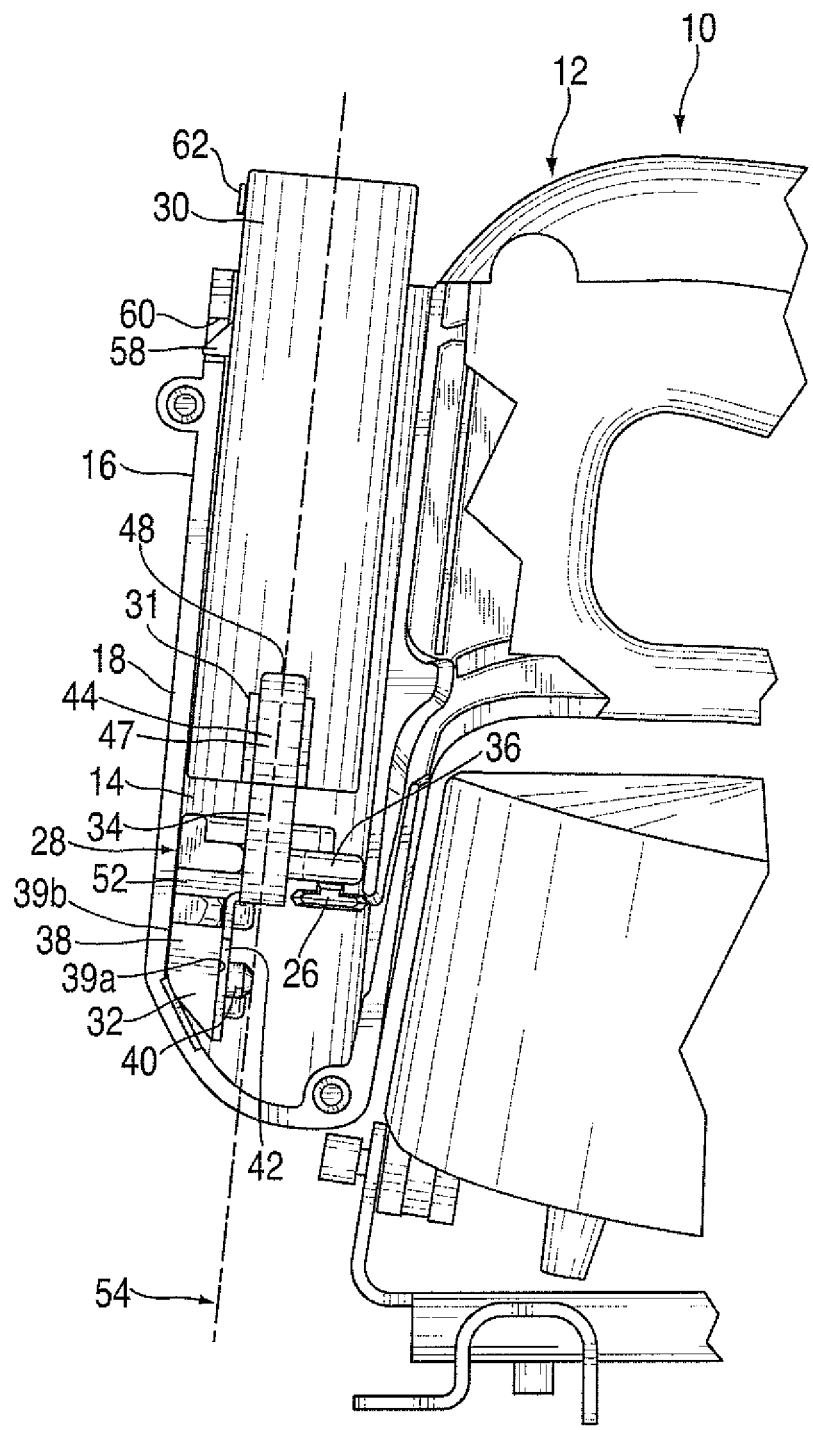
FIG. 4 is a fragmentary side elevation view of the power tool of FIG. 3 showing the battery connected to the present battery module inside the tool housing.
Figure 5:
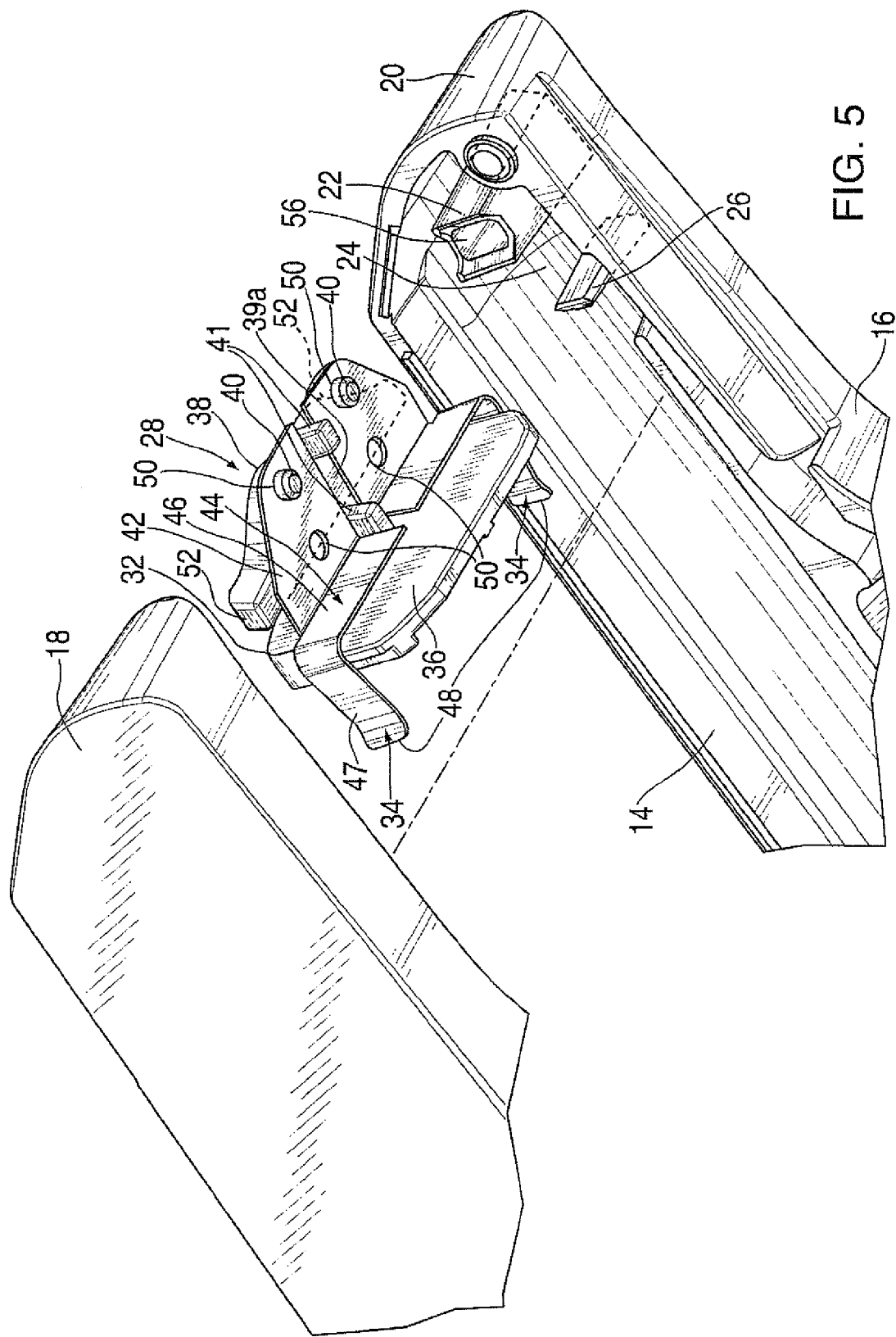
FIG. 5 is an exploded fragmentary, bottom perspective view of the present battery module removed from the tool housing.

Referring now to FIGS. 3-6, a power tool is generally designated 10 preferably is a combustion nailer of the general type described in the patents listed above and incorporated by reference in this present application. A tool housing 12 of the power tool 10 forms a tool interior chamber 14, the size and shape of the tool chamber being defined by tool housing walls 16. As is known in the art, the tool housing 12 is formed by connecting a first housing member 18 and a second housing member 20 together (FIG. 5). The first and second housing members 18, are generally mirror images of each other and are typically fastened together by threaded fasteners. However, such connection may also be achieved by a snap-fit or friction-fit connection or by any suitable releasable connection method.

Referring now to FIG. 5, at least one and preferably both of the first and second housing members 18, 20 include at least one elongated, socket-like receptacle 22 that extends from an inside surface 24 of the respective housing member. The receptacles 22 are hollow, tube-like structures that have a generally rectangular cross-sectional shape. However, the specific shape of the receptacle 22 may vary to suit the application. Preferably, the receptacles 22 on the first and second housing members 18, 20 are generally aligned with each other and oppose each other upon assembly of the housing 12. Each of the first and second housing members 18, 20 also includes at least one rib 26 that projects from the corresponding inside surface 24. The ribs 26 are in spaced, parallel orientation to the respective receptacles 22.

A battery contact module, generally designated 28, is inserted into the tool housing 12 to connect with a battery 30 (FIG. 4) and more specifically, electrical battery terminals 31 for providing electrical energy to the power tool 10. The battery module 28 includes a contact block 32 and at least two opposing, electrical module terminals 34 that are connected to the contact block. As shown, the contact block 32 includes a first planar member 36 and a second planar member 38 that depends transversely from the first planar member.

As seen in FIG. 4, the second planar member 38 is offset relative to the first planar member 36 to form a general "L"-shape when viewed from the side. The first and second planar members 36, 38 may be connected together by integrally forming the first and second planar members, ultrasonic welding, chemical adhesives or by any suitable connection method. It is preferred that the contact block 32 and more specifically, the first and second planar members 36, 38 are made of a non-conductive, electrically insulating material, such as plastic, and the electrical terminals 34 are made of an electrically conductive material, such as metal.

As shown in FIGS. 4 and 5, the second planar member 38 includes a first side 39a and a second side 39b and at least one, and more preferably two spaced generally co-linear and co-planar lugs 40 that protrude from the first side. The lugs 40 are used to attach the module terminals 34 to the contact block 32 as further described below. Additionally, at least one, and preferably a pair of spaced, isolating members 41, preferably having a generally rectangular cross-sectional shape, protrude from the first side 39a of the second planar member 38 where one of the isolating members is linearly aligned with the lugs 40. It should be appreciated that the isolating members 41 may be positioned at any suitable location between the module terminals 34 and may have any suitable shape. As shown, the isolating members 41 have a designated thickness that electrically isolates the respective module terminals 34 from each other to prevent electrical shorts or other electrical malfunctions.

Figure 6:
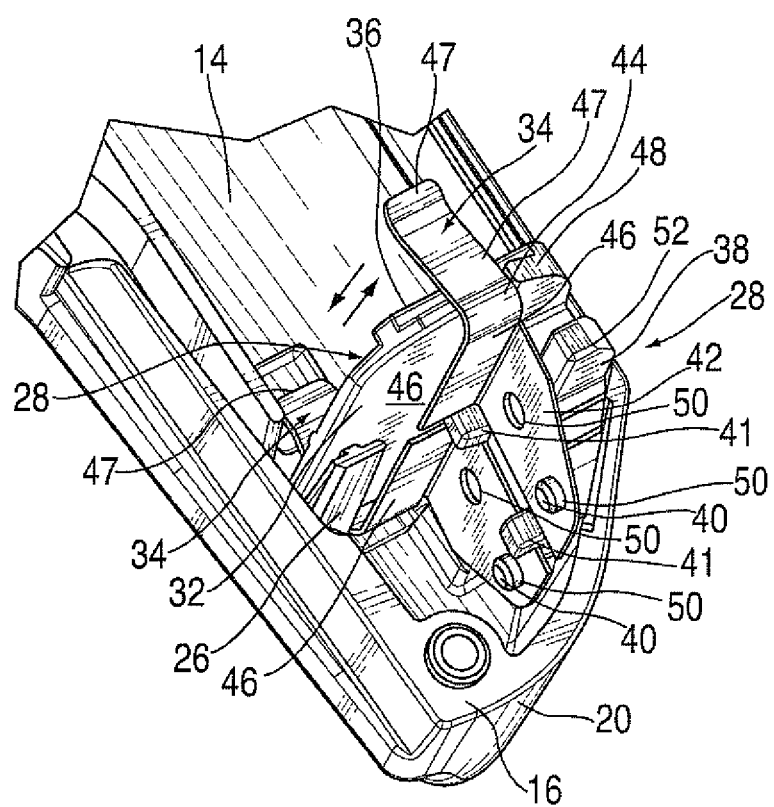
FIG. 6 is an enlarged, fragmentary bottom perspective view of the present battery module seated in the tool housing.

Referring now to FIGS. 4-6, the module terminals 34 are attached to at least one of the first and second planar members 36, 38 of the contact block 32. In the illustrated embodiment, each module terminal 34 has a generally planar connecting portion 42 offset from and integrally formed with a strap-like prong 44. Included on the prong 44 is a mounting portion 46 that is generally straight, following an underside of the first planar member 36, and a contact portion 47 that projects transversely to the mounting portion and has a slightly, outwardly curved tip 48 which is spring-biased for exerting pressure on the respective battery terminal 31 (see reference number 104 in FIG. 1).

The connecting portions 42 of the respective positive and negative module terminals 34 are separated by the isolating members 41. Each connecting portion 42 defines at least two holes 50 configured to receive the lugs 40 by a friction-fit or snap-fit connection (FIG. 5) to securely mount the module terminals 34 to the contact block 32. Each of the contact portions 47 of the module terminals 34 extends outwardly from the first planar member 36 of the contact block 32, where the curved tips 48 of the module terminals provide a spring-like tension for applying pressure on the corresponding battery terminals 31. Each module terminal 34 is connected to an electrical circuit (not shown) in the tool 10 by conventional wire leads as is known in the art.

Referring now to FIGS. 5 and 6, at least one, and preferably two locating posts 52 are integrally formed with the second planar member 38 of the contact block 32. The locating posts 48 are generally transverse to a longitudinal axis 54 (FIG. 4) of the tool housing 12 and extend outwardly from the second planar member 38. In the illustrated embodiment, the two locating posts 52 extend from opposing sides of the second planar member 38 and are configured to movably, matingly engage the receptacles 22 on the first and second tool housing members 18, 20. Movement of the locating posts 52 within the receptacles 22 allows the battery contact module 28 to move within the housing 12. Specifically, the locating posts 52 and receptacles 22 are configured so that there is clearance space formed between the locating posts 48 and inner surfaces 56 of the receptacles 22. The amount of clearance determines the extent of movement by the locating posts 52. For example, increasing the clearance between the posts 52 and the inner surfaces 56 of the receptacles 22 allows the battery module 28 more freedom of movement within the tool housing 12.

Upon assembly of the tool 10, the battery contact module 28 is inserted into the tool housing 12 so that the locating posts 52 are each positioned in the corresponding receptacles 22 on the first and second housing members 18, 20. Also, the ribs 26 are adjacent to and positioned behind the contact block 32, i.e., on the side of the contact block that is opposite to the battery as shown in FIG. 4. This arrangement permits limited or restricted movement of the battery module 28 within the tool housing 12. As such, the ribs 26 prevent the battery module 28 from moving out of alignment or position during tool operation so that the module terminals 34 and the battery terminals 31 remain in contact. The ribs 26 also provide support for the battery contact module 28 against the inward movement of the battery 30 when the battery is connected to the battery contact module. Preferably, the battery 30 is inserted into the tool housing 12 until at least one spring-biased latch 58 engages an opening 60 in the housing (FIG. 4). The engagement between the latch 58 and the tool housing 12 secures the battery 30 in position relative to the housing. To remove the battery 30, a user presses a button 62 which releases the latch 58 from the opening 60 and allows the battery to slide out of the tool housing 12.

In operation, the battery contact module 28 moves within the tool housing 12 as indicated by the arrows shown in FIG. 6. More specifically, when the battery 30 is inserted into the power tool 10, the battery terminals 31 contact the module terminals 34 on the battery contact module 28 to form an electrical connection between these two components. Preferably, the battery contact module 28 and the battery 30 are aligned such that the terminals 34 maintain constant contact pressure with the corresponding battery terminals 31.

Figure 1:
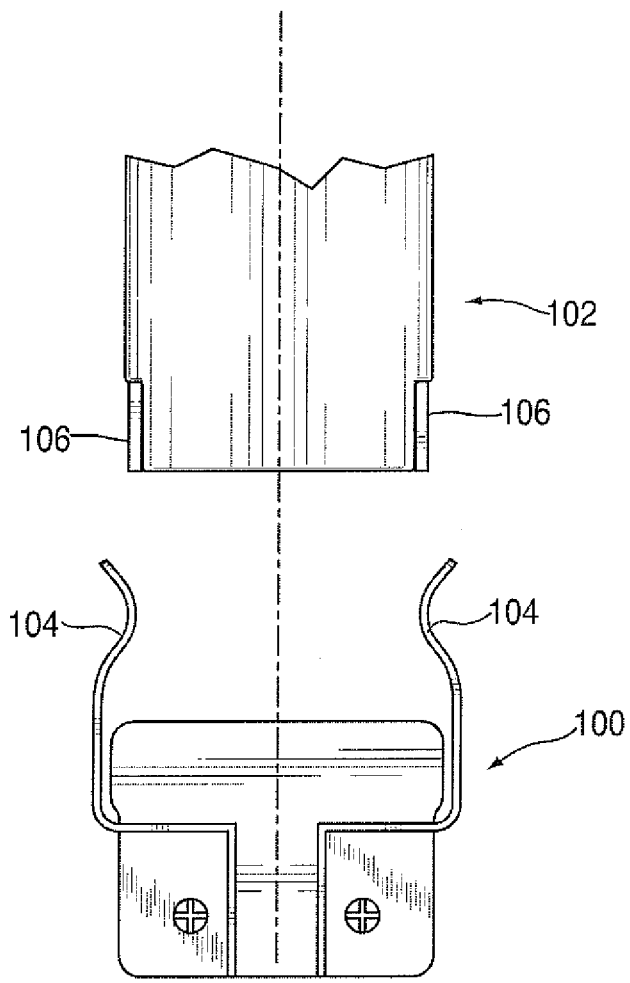
FIG. 1 is a fragmentary side view of a conventional prior art battery and battery module of a power tool where the battery and the battery module are aligned with each other.
Figure 2:
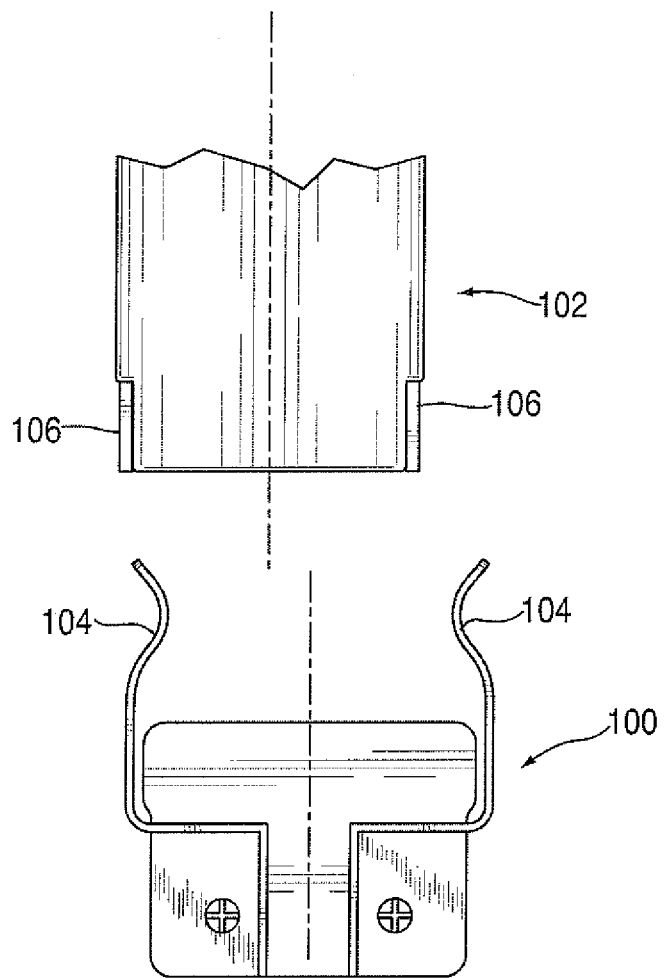
FIG. 2 is a fragmentary side view of a conventional prior art battery and battery module of a power tool where the battery and the battery module are not aligned with each other.
Figure 3:
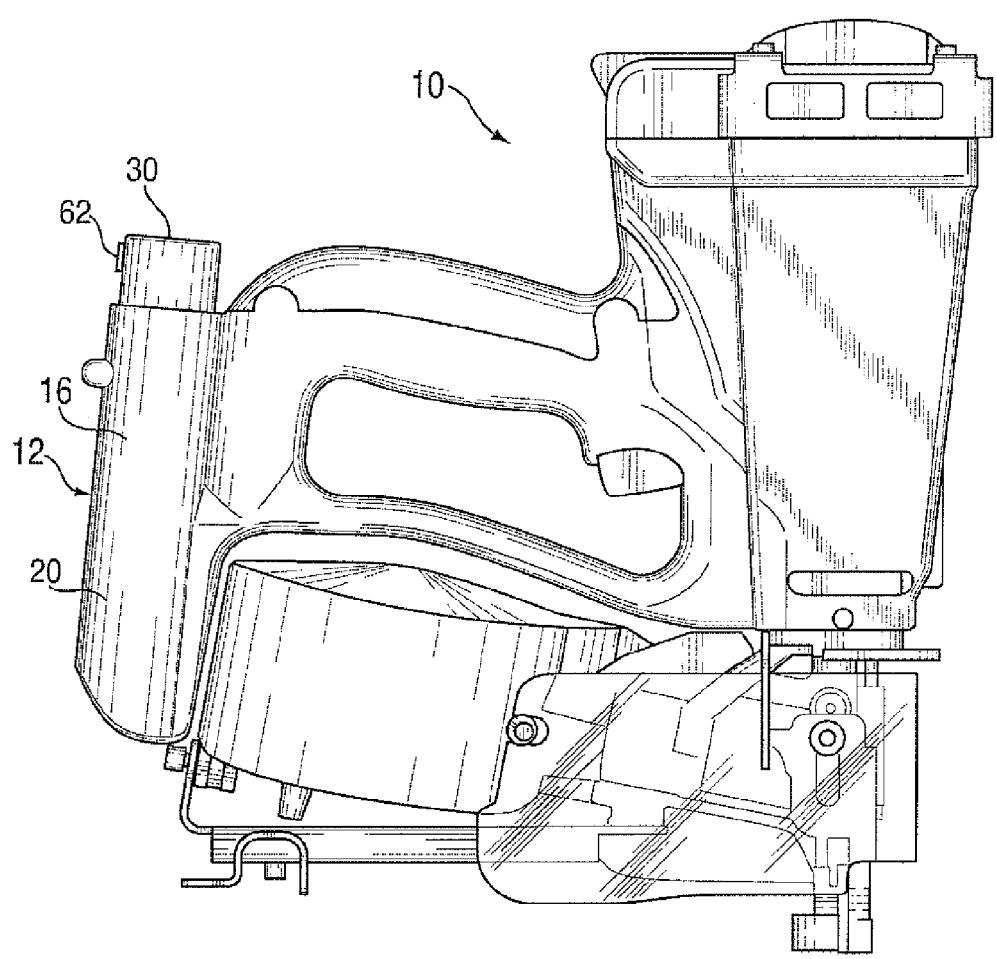
FIG. 3 is a side elevation view of a power tool incorporating the present battery module.

Referring now to FIGS. 1 and 2, in conventional batteries, however, the battery module 100 is fixed in place and does not move within the tool housing. As a result, if the battery module 100 is misaligned with the battery 102 due to manufacturing variations, there may be little or no contact between the respective electrical terminals 104, 106 of the battery module and the battery. For example, as seen in FIG. 2, misalignment of the battery module 100 and the battery 102 may result in one module terminal 104 contacting a respective battery terminal 106, whereas the other module terminal 104 is not contacting or is barely contacting the other battery terminal 106.

To overcome such problems, the present battery contact module 28 is configured to move within the tool housing 12 as described above to allow the terminals 34 on the battery contact module to align with and apply constant pressure to the battery terminals 31. Thus, the present battery contact module 28, and more specifically the contact block 32, moves relative to the tool housing 12 and the battery 30 to allow the module terminals 34 to move and thereby evenly contact and apply constant pressure on the battery terminals 31 each time the battery 30 is inserted into the power tool 10 to efficiently transfer electrical energy from the battery to the power tool for tool operation.

While a particular embodiment of the present floating battery contact module for use in a power tool has been described herein, it will be appreciated by those skilled in the art that changes and modifications may be made thereto without departing from the invention in its broader aspects and as set forth in the following claims.

The invention of claimed is:

1. A battery contact module for use in a power tool including a tool housing and a battery insertable into the tool housing, the battery contact module comprising:
    a contact block including at least one locating post that is movably connected to the tool housing, the tool housing being configured to limit movement of said at least one locating post and thereby said contact block relative to the tool housing; and
    a pair of opposing terminals attached to said contact block and configured to contact the battery, wherein the contact block moves relative to the tool housing and the battery as the battery is inserted into the tool housing to maintain constant electrical contact pressure between each of said terminals and the battery.

2. The battery contact module of claim 1, wherein the tool housing includes a receptacle and said at least one locating post is movably, matingly enagaged in said receptacle.

3. The battery contact module of claim 1, wherein said contact block includes a second, opposing locating post, each of said locating posts being movably, matingly engaged in corresponding receptacles located in the housing.

4. The battery contact module of claim 1, wherein said contact block includes a first planar member and a second planar member connected together, said first planar member being transverse to said second planar member, wherein said terminals are connected to said first planar member.

5. The battery contact module of claim 1, wherein said contact block includes two lugs connected to a corresponding holes defined by said terminals for connecting said terminals to said contact block.

6. The battery contact module of claim 1, wherein said contact block includes at least one isolating member protruding from a side of said contact block, said at least one isolating member being positioned between said terminals to electrically isolate said terminals.

7. The battery contact module of claim 1, wherein said contact block includes at least one receptacle and at least one rib, said at least one locating post being movably engaged with said at least one receptacle for allowing movement of said contact block and said at least one rib being positioned adjacent to said contact block to restrict the movement of said contact block.

8. A power tool, comprising:
    a housing defining a longitudinal axis and including a pair of opposing receptacles;
    a battery insertable into said housing and including two battery terminals;
    a battery contact module including a contact block having a pair of locating posts, each of said posts being movably connected to a corresponding one of said receptacles; and
    a pair of opposing module terminals attached to said contact block and configured to contact said battery terminals, wherein clearance between said receptacles and said locating posts enables said battery contact module to move within said housing to maintain constant contact pressure between said module terminals and said battery terminals.

9. The power tool of claim 8, further comprising a rib extending from an inside surface of said housing and positioned adjacent to said contact block to restrict movement of said contact block within said housing.

10. The power tool of claim 8, wherein said housing includes a first housing member and a second housing member, each of said first and second housing members being configured such that upon assembly of said housing, said module is captured in said housing allowing restricted movement of said battery contact module within said housing.

11. The power tool of claim 8, wherein each of said first and second housing members includes a rib respectively extending from an inside surface of said first and second housing members, each of said ribs being positioned adjacent to said contact block to restrict movement of said battery contact module within said housing.

12. The battery contact module of claim 8, wherein said contact block includes a first planar member and a second planar member extending transversely from said first planar member, said first planar member being offset from said second planar member such that said first and second planar members form an "L" shape.

13. The battery contact module of claim 12, wherein said second planar member includes two spaced lugs configured to engage corresponding holes defined by said module terminals to connect said module terminals to said contact block.

14. The battery contact module of claim 8, wherein said contact block includes two lugs configured to engage a corresponding hole defined by each of said module terminals to connect said module terminals to said contact block.

15. The battery contact module of claim 8, wherein said contact block includes two, spaced isolating members that are positioned between said module terminals upon assembly to electrically isolate said module terminals from each other.

16. The battery contact module of claim 8, wherein a distance between said locating posts and inner surfaces of said receptacles defines the clearance between said locating posts and said receptacles, wherein the movement of the battery contact module increases as the clearance between said locating posts and said receptacles increases.

17. A battery contact module for use in a power tool including a tool housing and a battery insertable into the tool housing, the battery contact module comprising:
    a contact block movably connected to the tool housing;
    a pair of opposing terminals attached to said contact block and configured to contact the battery;
    a receptacle defined by a wall extending from the tool housing and positioned adjacent to a side of said contact block, wherein said contact block movably engages said receptacle; and
    a rib extending from the tool housing and spaced along the direction of insertion from said receptacle, said rib being positioned adjacent to said side of said contact block to restrict movement of said contact block within said housing,
    wherein said contact block moves relative to the tool housing and the battery as the battery is inserted into the tool housing to maintain constant electrical contact pressure between each of said terminals and the battery.

18. The battery contact module of claim 17, wherein said rib and said receptacle are parallel to each other.

19. The battery contact module of claim 17, further comprising an additional rib extending from the tool housing, wherein said rib and said additional rib are spaced from said receptacle, said rib and said additional rib being positioned adjacent to a common side of said contact block to restrict movement of said contact block within said housing.

\* \* \* \* \*